(12) United States Patent  (10) Patent No.: US 7,864,483 B2
Tanner  (45) Date of Patent: Jan. 4, 2011

(54) METHOD AND APPARATUS FOR ADAPTIVE GAIN BALANCING OF AT LEAST ONE OF TWO ROTATIONAL SENSORS IN A HARD DISK DRIVE

(75) Inventor: Brian K. Tanner, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 12/414,629

(22) Filed: Mar. 30, 2009

(65) Prior Publication Data

US 2010/0246052 A1  Sep. 30, 2010

(51) Int. Cl.
 *G11B 21/02* (2006.01)
(52) U.S. Cl. .......................................................... 360/75
(58) Field of Classification Search ........................ None
 See application file for complete search history.

(56) References Cited

U.S. PATENT DOCUMENTS 7,548,396 B2 * 6/2009 Higashino ................. 360/78.05
2009/0279198 A1 * 11/2009 Tanner ........................ 360/71

* cited by examiner

*Primary Examiner* — K. Wong
(74) *Attorney, Agent, or Firm* — GSS Law Group

(57) ABSTRACT

A hard disk drive and its circuit board and an integrated circuit are disclosed using two piezoelectric devices each having one terminal used to generate signal. The first signal goes to one input of a differential amplifier. The second signal goes to an amplifier whose gain is controlled to create an amplified second signal for the differential amplifier whose output and the first and second signals create a selected signal received by an A/D converter to create a sampled signal used to create a linear disturbance signal and/or a rotational compensation signal, which in turn are used to control the gain of the amplifier to minimize a PES envelope and/or a harmonic PES envelope either in calibration or normal operation of the hard disk drive.

20 Claims, 6 Drawing Sheets

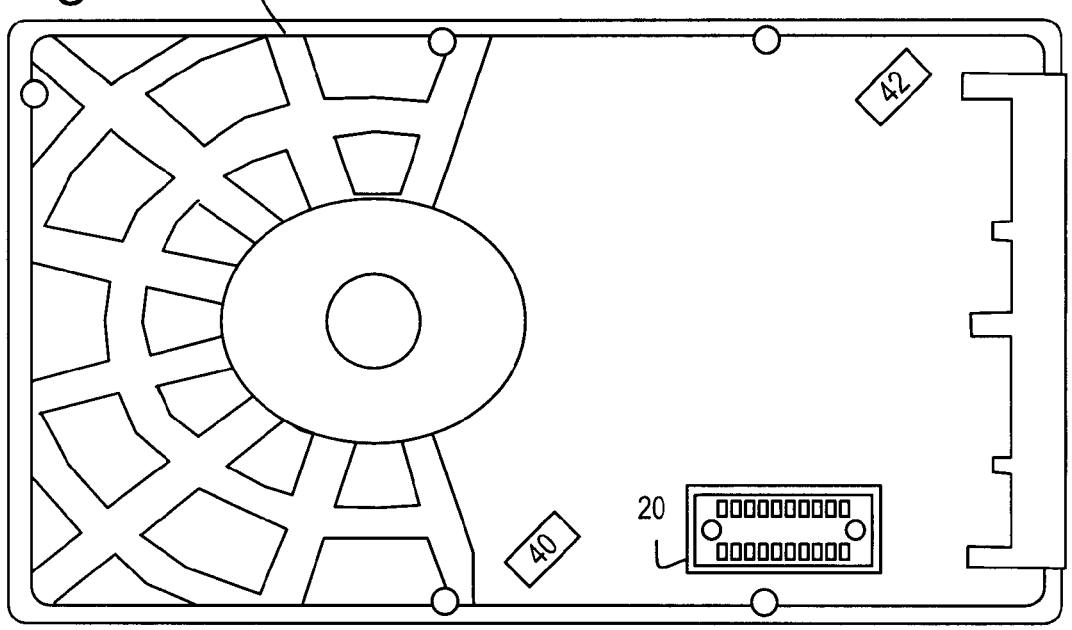
Fig. 9  Disk base 2
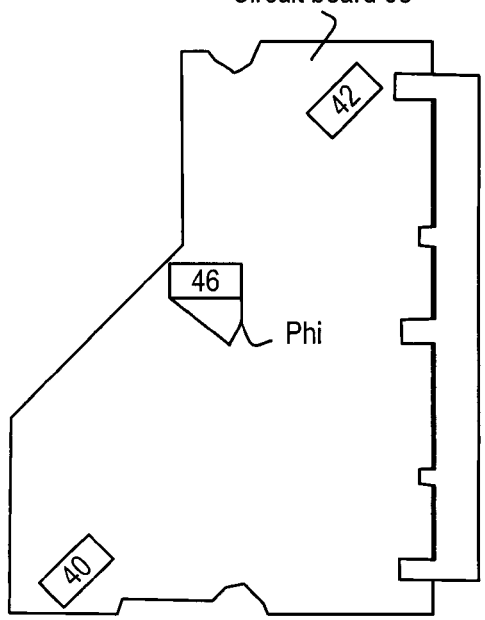
Fig. 10
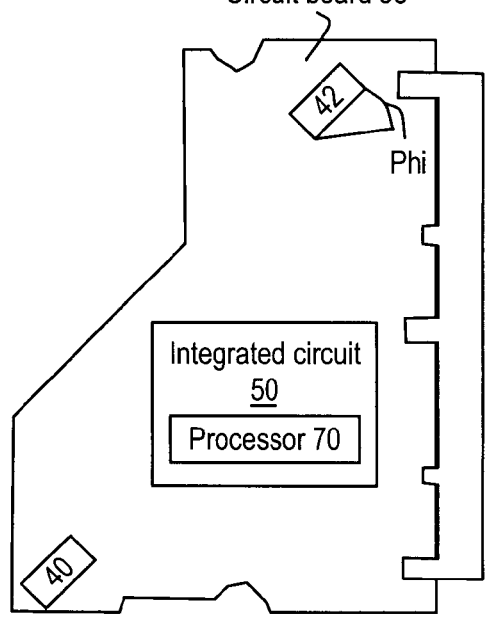
Fig. 11

METHOD AND APPARATUS FOR ADAPTIVE GAIN BALANCING OF AT LEAST ONE OF TWO ROTATIONAL SENSORS IN A HARD DISK DRIVE

TECHNICAL FIELD

This invention relates to the sensing of rotational vibrations in a hard disk drive.

BACKGROUND OF THE INVENTION

Hard disk drives often experience rotational vibrations that can directly and significantly affect the quality of slider positioning. Typically two piezoelectric sensors are used to determine the extent of rotational vibration. What continues to be needed are performance improvements in the estimation of rotational vibration.

SUMMARY OF THE INVENTION

Embodiments of the invention include a hard disk drive including at least two piezoelectric sensors, with each of the piezoelectric sensors providing a terminal for a signal. The first piezoelectric device's first terminal is used to provide a first signal presented as one of the differential inputs to a differential amplifier. The second piezoelectric device's first terminal is used to provide the input to an amplifier with a configurable gain to create an amplified second signal provided as the second differential input to the differential amplifier. Based upon the first signal and the amplified second signal, the differential amplifier generates a difference signal presented, along with the first signal and the second signal to an analog multiplexer to create a selected analog signal received by an analog to digital converter to create a sampled signal.

The hard disk drive operates in the following manner: During manufacturing, a gain control is created by optimizing the Position Error Signal (PES) envelope, where the PES results from reading and/or writing at least one track on a rotating disk surface within the hard disk drive. During normal read and write accesses of the rotating disk surface, the amplifier's gain is configured by the gain control and may be adaptively modified based upon a linear disturbance signal and/or a rotational compensation signal. The linear disturbance signal and the rotational compensation signal may be derived from the sampled signals generated by the analog to digital converter. Alternatively, during normal access operations, the gain control may be adaptively modified based upon a harmonic PES envelope derived from the PES.

The hard disk drive may include a circuit board, and further may include an integrated circuit containing the amplifier, the differential amplifier, the analog multiplexer and the analog to digital converter. The circuit board and possibly the integrated circuit may include a processor communicating with the amplifier to control its gain, the analog multiplexer to control the analog signal it selects and to receive the sampled signal from the analog to digital converter. The processor may be included in the integrated circuit or may be part of another component of the circuit board.

One or both of the two piezoelectric devices may be mounted on the disk base and/or mounted on the circuit board.

BRIEF DESCRIPTION OF THE DRAWINGS

FIG. 9 shows the disk base mounted with the first piezoelectric device and the second piezoelectric device.

FIG. 10 shows the circuit board with the first and second piezoelectric devices as well as a third piezoelectric device mounted at an angle Phi off of the circuit board for use to determine the linear disturbance signal particularly in the perpendicular direction to the circuit board.

And FIG. 11 shows the circuit board with the second piezoelectric device mounted at the angle Phi and including an embodiment of the integrated circuit that includes the processor.

DETAILED DESCRIPTION

Figure 2:
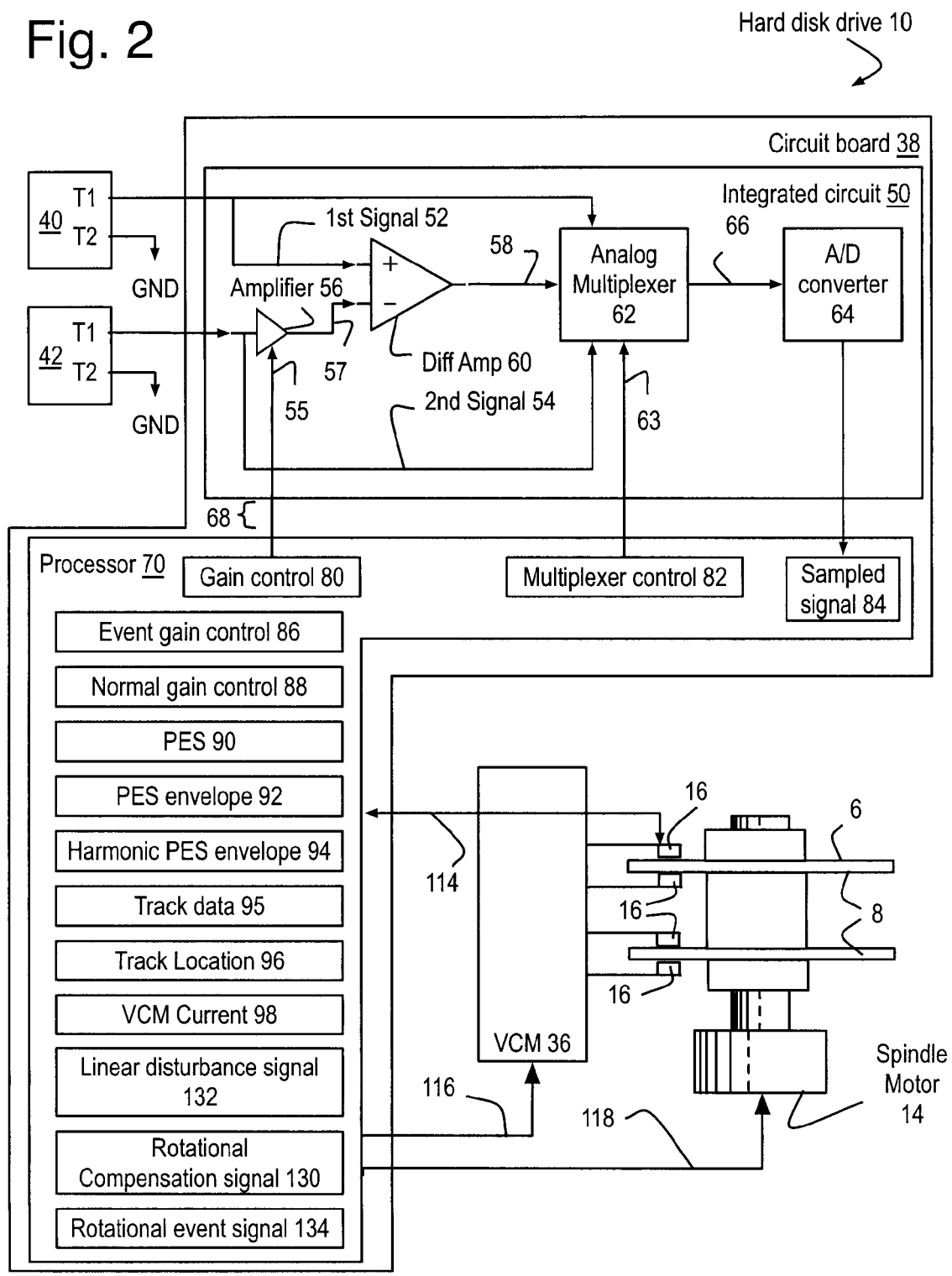
FIG. 2 shows a simplified schematic block diagram of the hard disk drive including two piezoelectric devices, the first including a first terminal used to generate a first signal received by a differential amplifier that may be included in the circuit board and possibly an integrated circuit. The circuit board and possibly an integrated circuit may further include an amplifier configured to use the first terminal of the second piezoelectric device as a second signal, with the gain of the amplifier configured in accord with the invention. The output of the amplifier creates an amplified second signal provided as a second input of the differential amplifier to create a difference signal provided to an analog multiplexer along with the first and second signal. The analog multiplexer is configured in accord with the invention to create a selected analog signal received by an analog to digital converter to create a sampled signal. The circuit board and possibly the integrated circuit may further include a processor communicating with the amplifier to control its gain and with the analog multiplexer to control its selection and with the analog to digital converter to receive its sampled signal. The sampled signal may be used to create a linear disturbance signal and a rotational compensation signal. The linear disturbance signal uses sampled signals of the first signal and the second signal. The rotational compensation signal uses the sampled signal of the difference signal.

This invention relates to the sensing of rotational vibrations in a hard disk drive. By way of introduction, embodiments of the invention include a hard disk drive 10 including at least two piezoelectric sensors 40 and 42, with each of the piezoelectric sensors providing a terminal T1 for a signal as shown in FIG. 2. The first piezoelectric device's first terminal is used to provide a first signal 52 presented as one of the differential inputs to a differential amplifier 64. The second piezoelectric device's first terminal is used to provide the input as a second signal 54 to an amplifier 56 with a configurable gain 55 to create an amplified second signal 57 provided as the second differential input to the differential amplifier. Based upon the first signal and the amplified second signal, the differential amplifier generates a difference signal 58 presented, along with the first signal and the second signal to an analog multiplexer 62 to create a selected analog signal 66 received by an analog to digital converter 64 to create a sampled signal.

Figure 1:
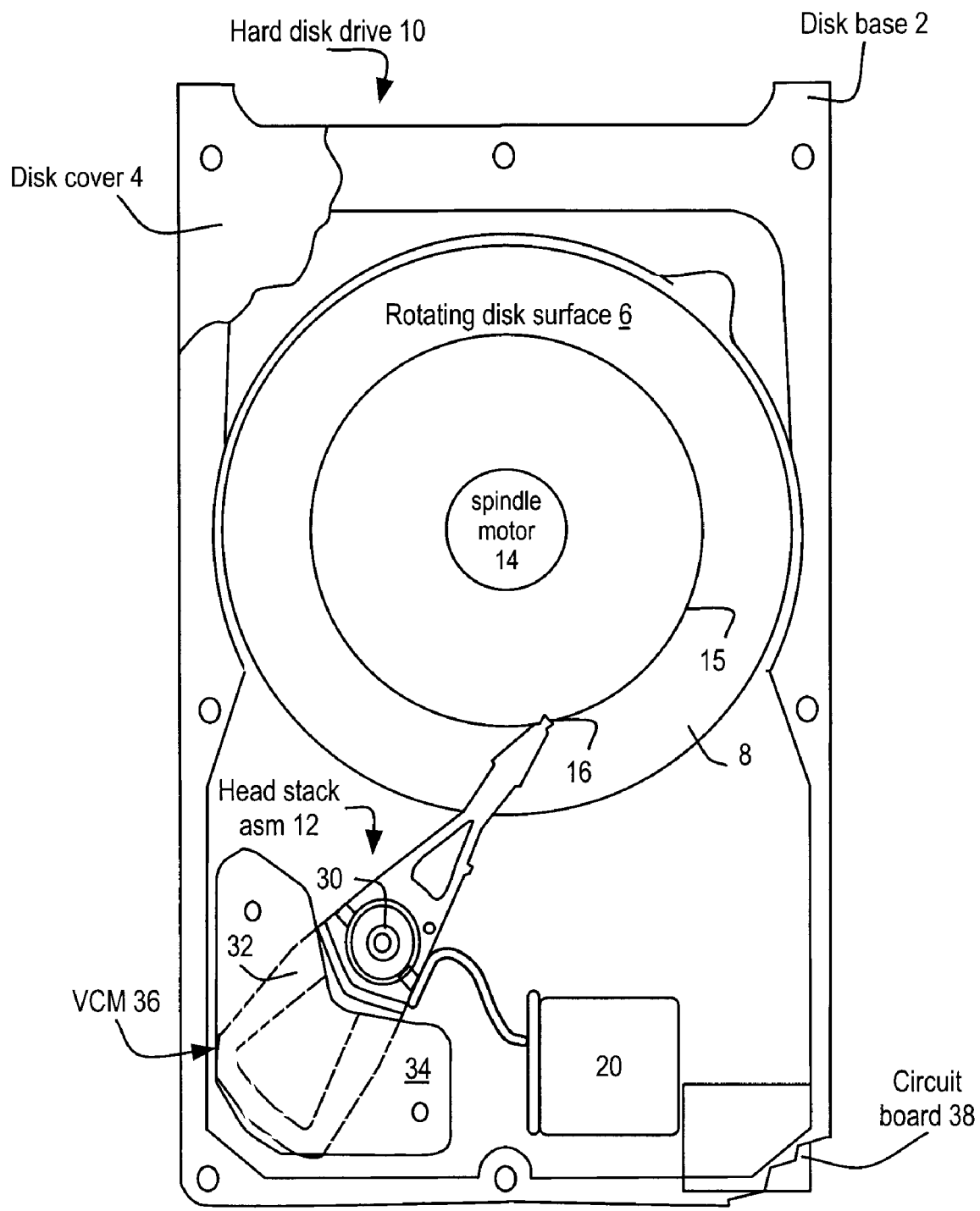
FIG. 1 shows an example embodiment of a hard disk drive that includes a disk base with a spindle motor mounted on it and coupled to at least one disk to create a rotating disk surface. A voice coil motor is mounted on the disk base with its head stack assembly coupling through an actuator pivot to position at least one slider near a track on at least one of the rotating disk surfaces. Communications between the slider and other components of the head stack assembly are sent via an interface to a circuit board mounted on the opposite side of the disk base from the disks and voice coil motor. A disk cover is mounted on the disk base to enclose the disks, spindle motor and voice coil motor.

Referring to the drawings more particularly by reference numbers, FIG. 1 shows an example embodiment of a hard disk drive 10 that includes a disk base 2 with a spindle motor 14 mounted on it and coupled to at least one disk 8 to create a rotating disk surface 6. A voice coil motor 36 is mounted on the disk base with its head stack assembly 12 coupling through an actuator pivot 30 to position at least one slider 16 near a track 15 on at least one of the rotating disk surfaces. The voice coil motor pivots about the actuator pivot, moving in response to electrical stimulus of the voice coil 32 and its interaction with a fixed magnet assembly 34. Communications between the slider and other components of the head stack assembly are sent via an interface 20 to a circuit board 38 mounted on the opposite side of the disk base from the disks and voice coil motor. A disk cover 4 is mounted on the disk base to enclose the disks, spindle motor and voice coil motor.

Before describing the operation of the inventions embodiments, consider FIG. 2, showing the hard disk drive 10 including at least two piezoelectric sensors, with each of the piezoelectric sensors providing a terminal T1. The first piezoelectric device 40 has its first terminal T1 used to provide a first signal 52 presented as one of the differential inputs to a differential amplifier 64. The second piezoelectric device 42 has its first terminal used to provide a second signal 54 to an amplifier 56 with a configurable gain 55 to create an amplified second signal 57 provided as the second differential input to the differential amplifier. Based upon the first signal and the amplified second signal, the differential amplifier generates a difference signal 58 presented, along with the first signal and the second signal to an analog multiplexer 62 to create a selected analog signal 66 received by an analog to digital converter 64 to create a sampled signal 84.

As shown in this Figure the first signal 52 provides a positive differential input to the differential amplifier 60 with the amplified second signal 57 providing the negative differential input, however in other embodiments these signals may be reversed as inputs.

The circuit board 38 and possibly an integrated circuit 50 may further include the amplifier 56, the differential amplifier 60, the analog multiplexer 62 and the analog to digital converter 64. The circuit board and possibly the integrated circuit may further include a processor 70 communicating 68 with the amplifier to control its gain 55 and with the analog multiplexer to control 63 its selection and with the analog to digital converter to receive its sampled signal 84. The sampled signal may be used to create a linear disturbance signal 132 and a rotational compensation signal 130. The linear disturbance signal may use sampled signals of the first signal 52 and the second signal 54.

The rotational compensation signal 130 may use the sampled signal 84 of the difference signal 58. The rotational compensation signal may be used to assert a rotational event signal 134. The processor 70 may respond to the rotational event signal being asserted by using the event gain control 86 as the gain control 80 to configure the amplifier 56, otherwise the processor may respond to the non-asserting of the rotating event signal by using the normal gain control 88 as the gain control.

During normal operations within the hard disk drive 10, the processor 70 may stimulate 118 the spindle motor 14 to rotate one or more disks 8 coupled to its spindle to create at least one rotating disk surface 6. The processor may use the voice coil motor current 98 to electrically stimulate 116 the voice coil motor 36, in particular, the voice coil 32 of FIG. 1 to create a time-varying electromagnetic field that interacts with the fixed magnet 34 to pivot the head stack assembly 12 about the actuator pivot 30 to position the slider 16 near the track 15 on the rotating disk surface based upon a track location 96. The processor communicates 114 with slider's read-write head to create the track data 95 based upon its interaction with the track. The PES 90 is demodulated from the track, frequently before it is received at the processor. The processor uses the PES to derive its PES envelope 92 and/or its harmonic PES envelope 94. The PES envelope may be a min-max filter of a time domain window on the PES. The harmonic PES envelope may be the result of a Fast Fourier Transform (FFT) of the same or possibly a different time domain window on the PES.

Figure 3:
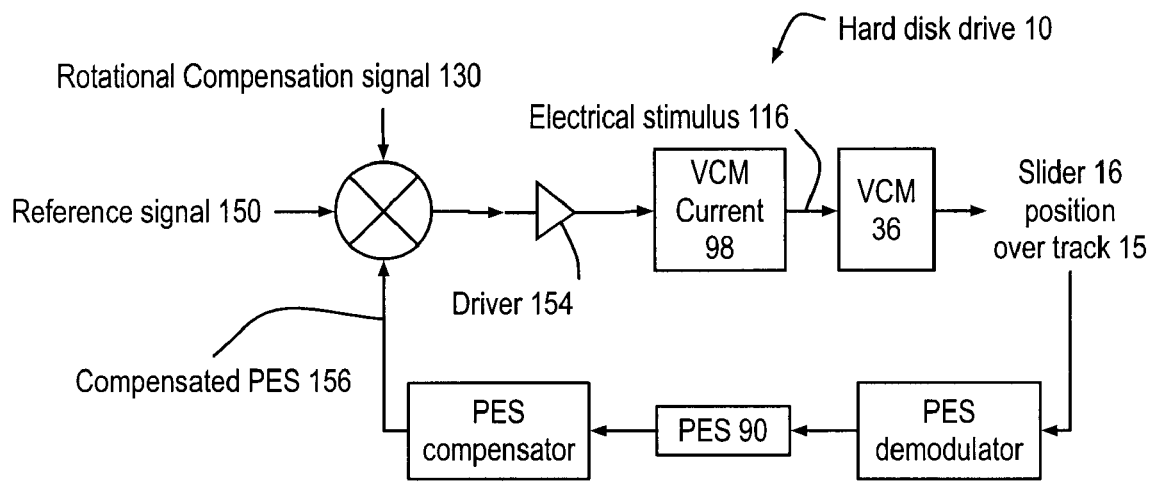
FIG. 3 shows a control flow feedback diagram of the hard disk drive with the rotational compensation signal being combined with a reference signal and a compensated PES signal to stimulate a driver to create the voice coil current as the electrical stimulus presented to the voice coil of the voice coil motor to alter the position of the slider over a track on the rotating disk surface. A PES demodulator operates on the read signals from the slider to create the PES that is received by a PES compensator to create the compensated PES signal that is fed back to optimize the position of the slider over the track.

FIG. 3 shows a control flow feedback diagram of the hard disk drive 10 with the rotational compensation signal 130 being combined with a reference signal 150 and a compensated PES signal 156 to stimulate a driver 154 to create the voice coil current 98 as the electrical stimulus 116 presented to the voice coil 32 of the voice coil motor 36 to alter the position of the slider 16 over the track 15 on the rotating disk surface 6. A PES demodulator operates on the read signals from the slider to create the PES 90 that is received by a PES compensator to create the compensated PES signal that is fed back to optimize the position of the slider over the track.

Figure 4:
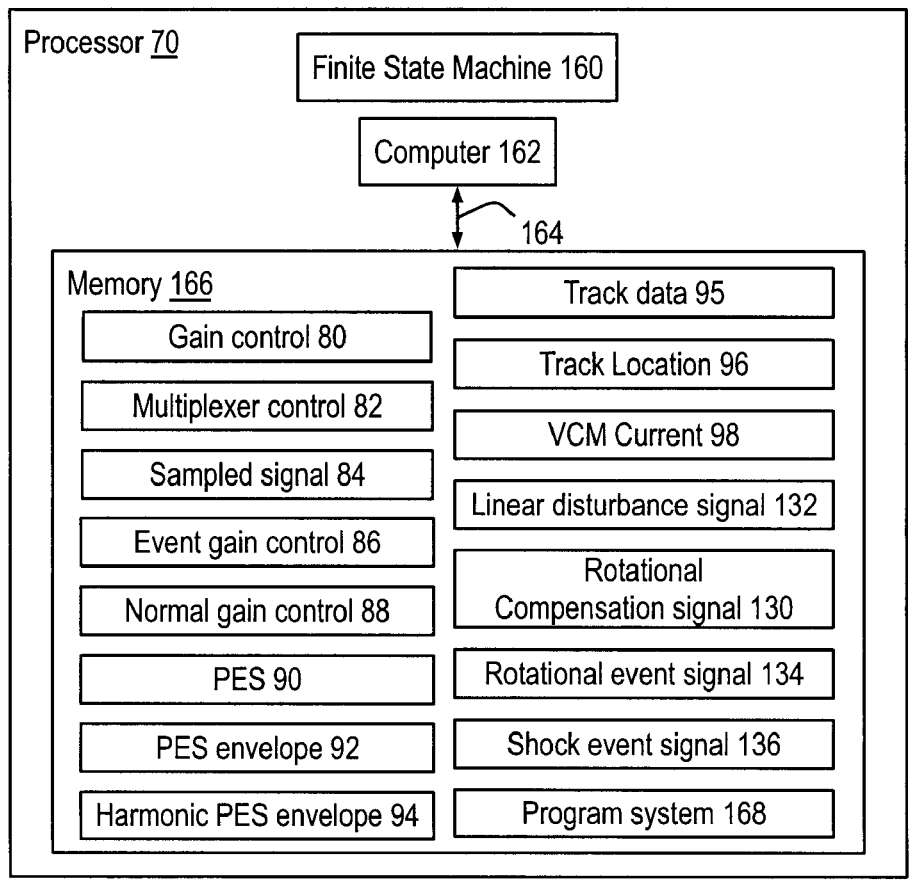
FIG. 4 shows that the processor may include at least one instance of a finite state machine and/or at least one instance of a computer accessibly coupled via a buss with a computer readable memory containing a program system for instructing the computer in accord with the various embodiments of the invention's methods and may further include combinations of one or more of the controls, parameters and signals discussed herein in a digital format.

FIG. 4 shows that the processor 70 may include at least one instance of a finite state machine 160 and/or at least one instance of a computer 162 accessibly coupled 164 via a buss with a computer readable memory 166 containing a program system 168 for instructing the computer in accord with the various embodiments of the invention's methods and may further include combinations of one or more of the controls 80, 82, 86, 88, parameters 96 and signals 84, 90, 92, 94, 95, 98, 130, 132 and 134 discussed herein in a digital format. Note that the voice coil current 98 may be represented in the memory 166 as a number, possibly in a fixed point or in a floating point notation referring to units which may or may not be in terms of a standard such as amperes.

As used herein, a computer 162 may include at least one data processor and at least one instruction processor, with each data processor instructed by at least one instruction processor through the access 164 of program steps of the program system 168 residing in the computer readable memory 166.

As used herein, a finite state machine 160 includes at least one input, maintains at least one state based upon at least one of the inputs and generates at least one output based upon the value of at least one of the inputs and/or based upon the value of at least one of the states.

Some of the following figures show flowcharts of at least one embodiment of the method, which may include arrows signifying a flow of control, and sometimes data, supporting various implementations of the invention's operations. These include a program operation, or program thread, executing upon a computer 162, and/or a state transition in a finite state machine 160. The operation of starting a flowchart refers entering a subroutine or a macro instruction sequence in the computer, and/or directing a state transition in the finite state machine, possibly while pushing a return state. The operation of termination in a flowchart refers completion of those operations, which may result in a subroutine return in the computer, and/or popping of a previously stored state in the finite state machine. The operation of terminating a flowchart is denoted by an oval with the word "Exit" in it.

Figure 5:
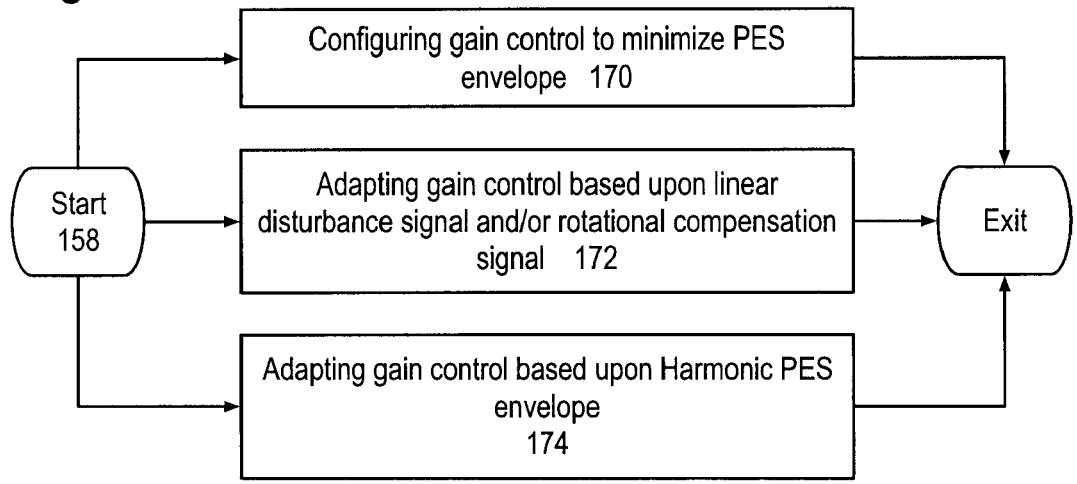
FIG. 5 shows a flow chart of the program system of FIG. 4 implementing examples of some of the inventions method steps that may individually or collectively be used to operate the hard disk drive in accord with the invention. The gain control may be configured to minimize the PES envelope, particularly during the calibration of an assembled hard disk drive to create an operational hard disk drive. The gain control may be adaptively modified during normal operations based upon the linear disturbance signal and/or the rotational compensation signal and/or based upon the harmonic PES envelope.

FIG. 5 shows a flow chart of the program system 158 of FIG. 4 implementing examples of some of the inventions method steps shown here as program steps that may individually or collectively be used to operate the hard disk drive 10 in accord with the invention. Various embodiments of the program system may include at least one of these program steps. Program step 170 supports configuring the gain control 80 to minimize the PES envelope 92, particularly during the calibration of an assembled hard disk drive to create the hard disk drive. This calibration of the gain control may initialize the normal gain control 88 or possibly the event gain control 86, for later use during normal disk access operations. Program step 172 supports adaptively modifying the gain control, often during normal operations, based upon the linear disturbance signal 132 and/or the rotational compensation signal 130. And program step 174 supports adaptively modifying the gain control based upon the harmonic PES envelope 94.

Figure 6:
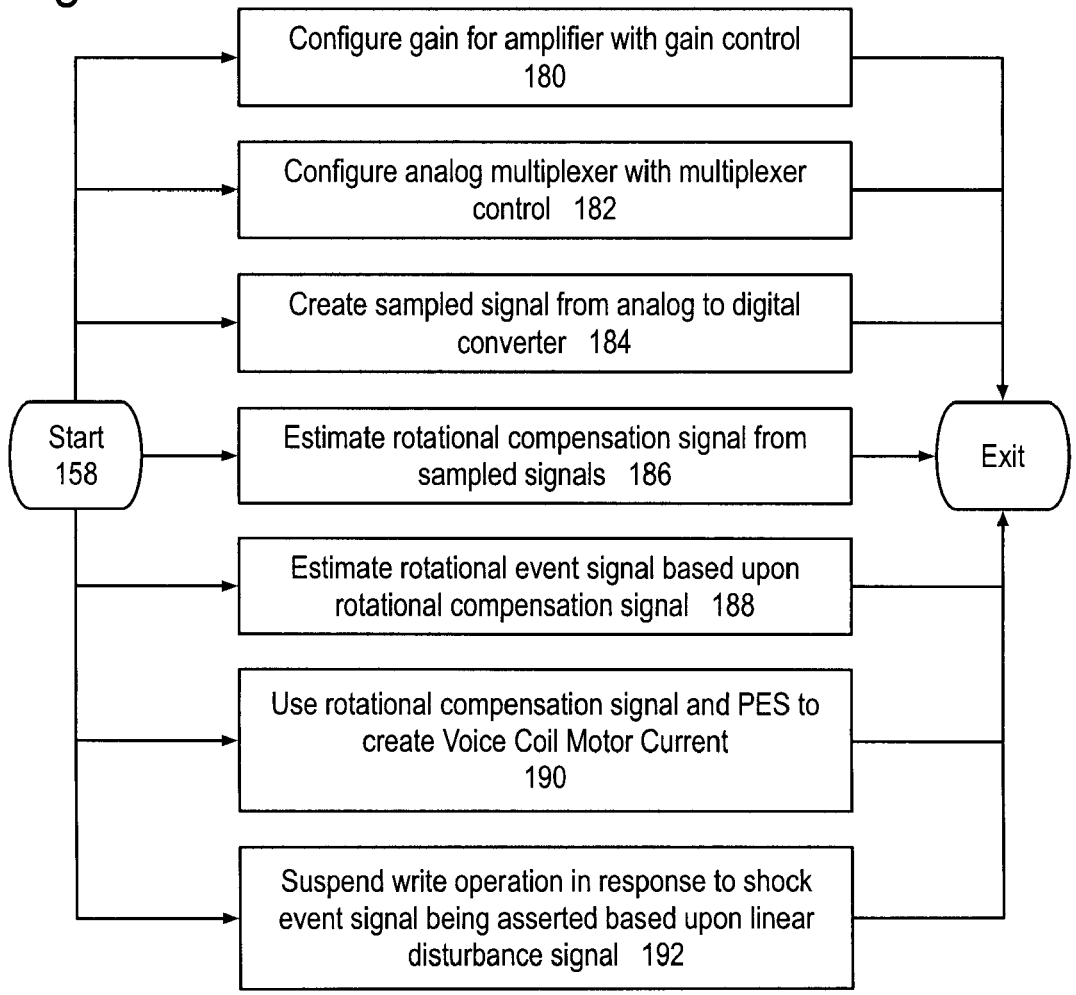
FIGS. 6 to 8 show further details of the program system with regards to the operation of the hard disk drive.
Figure 7:
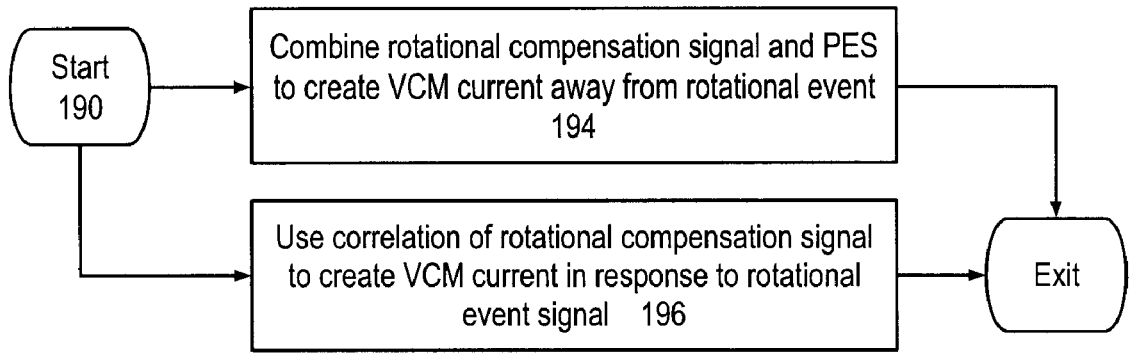
Figure 8:
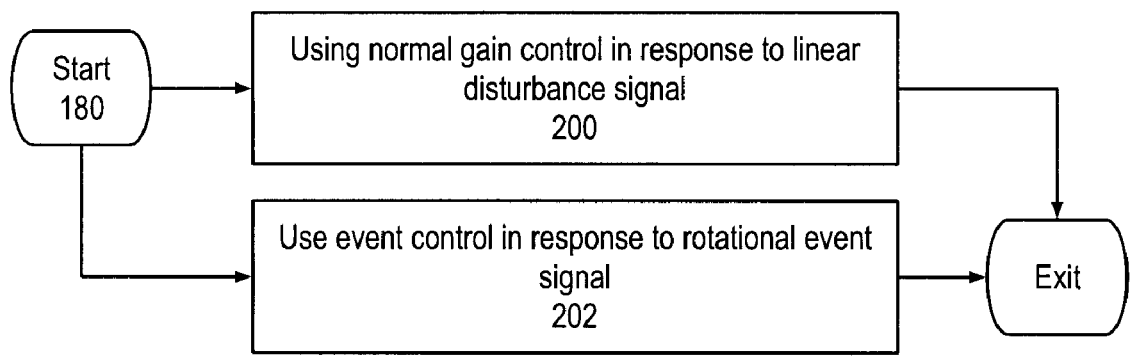

FIGS. 6 to 8 show flowcharts of further details of the program system 158 with regards to the operation of the hard disk drive 10.

FIG. 6 shows the program system 158 may further include at least one of the following program steps. Program step 180 supports configuring the gain 55 for the amplifier 56 with the gain control 80. Program step 182 supports configuring 63 the analog multiplexer 62 with the multiplexer control 182. Program step 184 supports creating the sampled signal 84 from the analog to digital converter 64. Program step 186 supports estimating the rotational compensation signal 130 from the sampled signals, possibly collected over time. Program step 188 supports estimating the rotational event signal 134 based upon the rotational compensation signal. Program step 190 supports using the rotational compensation signal and the PES 90 to create the Voice Coil Motor (VCM) current 98, possibly in a fashion similar to FIG. 3. Program step 192 supports suspending write operations in response to a shock event signal 136 being asserted based upon the linear disturbance signal. The shock event signal is often used to indicate a relatively high frequency event, such as dropping a portable device including the hard disk drive. The linear disturbance signal may well include one or more low frequency disturbances besides just the shock events.

FIG. 7 shows some possible refinements of the program step 190 creating the VCM current. Various embodiments of the invention may include one or both of these program steps. Program step 194 supports combining the rotational compensation signal 130 and the PES 90 to create the VCM current 98 away from a rotational event that may be indicated by the rotational event signal 134. The rotational event signal may act as a flag or Boolean variable in some embodiments of the invention. Program step 196 supports using a correlation of the rotational compensation signal to create the VCM current in response to the rotational event signal.

FIG. 8 shows some details of the program step 180 configuring the gain 55 for the amplifier 56 with the gain control 80. Program step 200 supports using the normal gain control 88 in response to the linear disturbance signal 132. Program step 202 supports using the event gain control 86 in response to the rotational event signal 134. Often in situations where both the linear disturbance signal and the rotational event signal are active, the normal gain control will be used.

FIGS. 9 to 11 show examples of various embodiments of the hard disk drive 10 and the mounting of the piezoelectric devices. FIG. 9 shows the disk base 2 mounted with the first piezoelectric device 30 and the second piezoelectric device 42 in essentially the plane of the disk base. FIG. 10 shows the circuit board 38 with the first piezoelectric device and second piezoelectric devices as well as a third piezoelectric device 46 mounted at an angle Phi off of the circuit board for use to determine the linear disturbance signal 132 particularly in the perpendicular direction to the circuit board. And FIG. 11 shows the circuit board with the second piezoelectric device mounted at the angle Phi and including an embodiment of the integrated circuit 50 that includes the processor 70.

The preceding embodiments provide examples of the invention, and are not meant to constrain the scope of the following claims.

What is claimed is:

1. A hard disk drive, comprising:
   a first piezoelectric device (40) and a second piezoelectric device (42), both including a terminal (T1); and
   a circuit board (38) coupled to first piezoelectric device and to said second piezoelectric device, with said circuit board including the configuration of
   a differential amplifier (60), an amplifier (56), an analog multiplexer (62), an analog to digital converter (64) and a processor (70) communicating a gain control (80) to said amplifier, a multiplexer control (82) to said analog multiplexer and receiving a sampled signal (84) from said analog to digital converter;
   a first signal (52) coupling said terminal of said first piezoelectric device to a first of two differential inputs of said differential amplifier;
   a second signal (54) coupling said terminal of said second piezoelectric device to an input of said amplifier to create an amplified second signal (57) coupled to a second of said differential inputs of said differential amplifier to create a difference signal (58) received by said analog multiplexer along with said first signal and said second signal to create a selected analog signal (66) presented to said analog to digital converter to create said sampled signal.

2. The hard disk drive of claim 1, wherein said processor is configured to respond to a Position Error Signal (PES) (90) results from accessing at least one track (15) on a rotating disk surface (6) to create said gain control.

3. The hard disk drive of claim 2, wherein said processor responds to said PES further comprises said processor configures said gain control to minimize a PES envelope based upon said PES.

4. The hard disk drive of claim 2, wherein said processor responds to said PES further comprises at least one member of the group consisting of:
said processor is configured to adapt said gain control based upon a linear disturbance signal (132) derived from said sampled signal from at least one of said first signal and said second signal;
said processor is configured to adapt said gain control based upon a rotational compensation signal (130) derived from said sampled signal from said difference signal; and
said processor is configured to adapt said gain control based upon a harmonic PES envelope (94) from said PES.

5. The hard disk drive of claim 4, wherein said processor is configured to create a Voice Coil Motor (VCM) current 98 by combining said rotational compensation signal and said PES away from a rotational event determined from said rotational compensation signal.

6. The hard disk drive of claim 4, wherein said processor is configured to create a Voice Coil Motor (VCM) current 98 by using a correlation of said rotational compensation signal in response to a rotational event signal derived from said rotational compensation signal.

7. The hard disk drive of claim 6, wherein said processor configures said gain of said amplifier based upon at least one member of the group consisting of: using a normal gain control (88) in response to said linear disturbance signal and using an event gain control (86) in response to said rotational event signal.

8. The hard disk drive of claim 1, further comprising an integrated circuit (50) including said amplifier, said differential amplifier, said analog multiplexer and said analog to digital converter.

9. The hard disk drive of claim 1, wherein at least one of the group consisting of said first piezoelectric device and said second piezoelectric device is mounted on a member of the group consisting of said circuit board and a disk base included in said hard disk drive.

10. A circuit board (38) configured for use in a hard disk drive (10), comprising:
means for coupling to a first piezoelectric device (40) and a second piezoelectric device (42), both including a terminal (T1) and both included in said hard disk drive;
a differential amplifier (60); an amplifier (56); an analog multiplexer (62); an analog to digital converter (64); and
a processor (70) communicating a gain control (80) to said amplifier, a multiplexer control (82) to said analog multiplexer and receiving a sampled signal (84) from said analog to digital converter;
a first signal (52) coupling said terminal of said first piezoelectric device to a first of two differential inputs of said differential amplifier;
a second signal (54) coupling said terminal of said second piezoelectric device to an input of said amplifier to create an amplified second signal (57) coupled to a second of said differential inputs of said differential amplifier to create a difference signal (58) received by said analog multiplexer along with said first signal and said second signal to create a selected analog signal (66) presented to said analog to digital converter to create said sampled signal.

11. The circuit board of claim 10, wherein said processor is configured to respond to a Position Error Signal (PES) (90) results from accessing at least one track (15) on a rotating disk surface (6) to create said gain control.

12. The circuit board of claim 11, wherein said processor responds to said PES further comprises said processor configures said gain control to minimize a PES envelope based upon said PES.

13. The circuit board of claim 11, wherein said processor responds to said PES further comprises at least one member of the group consisting of:
said processor is configured to adapt said gain control based upon a linear disturbance signal (132) derived from said sampled signal from at least one of said first signal and said second signal;
said processor is configured to adapt said gain control based upon a rotational compensation signal (130) derived from said sampled signal from said difference signal; and
said processor is configured to adapt said gain control based upon a harmonic PES envelope (94) from said PES.

14. The circuit board of claim 13, wherein said processor is configured to create a Voice Coil Motor (VCM) current 98 by combining said rotational compensation signal and said PES away from a rotational event determined from said rotational compensation signal.

15. The circuit board of claim 13, wherein said processor is configured to create a Voice Coil Motor (VCM) current 98 by using a correlation of said rotational compensation signal in response to a rotational event signal derived from said rotational compensation signal.

16. The circuit board of claim 15, wherein said processor configures said gain of said amplifier based upon at least one member of the group consisting of: using a normal gain control (88) in response to said linear disturbance signal and using an event gain control (86) in response to said rotational event signal.

17. The circuit board of claim 10, further comprising an integrated circuit (50) including said amplifier, said differential amplifier, said analog multiplexer and said analog to digital converter.

18. A integrated circuit (50) configured for use in a hard disk drive (10), comprising:
means for coupling to a first piezoelectric device (40) and a second piezoelectric device (42), both including a terminal (T1) and both included in said hard disk drive;
a differential amplifier (60); an amplifier (56); an analog multiplexer (62); an analog to digital converter (64); and
means for a processor (70) communicating a gain control (80) to said amplifier, a multiplexer control (82) to said analog multiplexer and receiving a sampled signal (84) from said analog to digital converter;
wherein a first signal (52) is configured to couple with said terminal of said first piezoelectric device to a first of two differential inputs of said differential amplifier;
wherein a second signal (54) is configured to couple with said terminal of said second piezoelectric device to an input of said amplifier to create an amplified second signal (57) coupled to a second of said differential inputs of said differential amplifier to create a difference signal (58) received by said analog multiplexer along with said first signal and said second signal to create a selected analog signal (66) presented to said analog to digital converter to create said sampled signal.

19. The integrated circuit of claim 18, wherein said processor is configured to respond to a Position Error Signal (PES) (90) results from accessing at least one track (15) on a rotating disk surface (6) to create said gain control.

20. The integrated circuit of claim 18, further including said processor.

* * * * *